United States Patent [19]

Brekka et al.

[11] 4,377,741

[45] Mar. 22, 1983

[54] APPARATUS FOR PRODUCING UPDATED INFORMATION ON A TANGIBLE MEDIUM

[75] Inventors: Thomas T. Brekka, Santa Cruz; Frank F. Stucki, Portola Valley, both of Calif.

[73] Assignee: The Brekka Corporation, Santa Cruz, Calif.

[21] Appl. No.: 163,317

[22] Filed: Jun. 26, 1980

[51] Int. Cl.³ .................. G06F 15/84; G06K 7/12
[52] U.S. Cl. .................... 235/472; 235/432
[58] Field of Search .......... 235/472, 431, 432, 454, 235/462, 385, 487; 346/75, 140 R; 340/146.3 SY, 146.3 ED, 146.3 MA; 364/403

[56] References Cited

U.S. PATENT DOCUMENTS

| | | | |
|---|---|---|---|
| 4,028,537 | 6/1977 | Snow | 235/472 |
| 4,088,981 | 5/1978 | Gott . | |
| 4,118,687 | 10/1978 | McWaters et al. . | |
| 4,121,222 | 10/1978 | Diebold et al. . | |
| 4,180,204 | 12/1979 | Koenig et al. | 235/472 |

OTHER PUBLICATIONS

"Read/Write Stylus", Uberbacher, IBM Tech. Discl. Bull., vol. 19, No. 1, Jun. 1976, pp. 177–178.

Primary Examiner—Thomas A. Robinson
Attorney, Agent, or Firm—Phillips, Moore, Lempio & Majestic

[57] ABSTRACT

Apparatus for producing updated information on a tangible medium including a hand-held type instrument having an optical character reader to read present information on the medium, a programmable bus-oriented computing type network, spaced from the instrument, which stores and compares the updated information with the present information being read and which outputs control words corresponding to the updated information if the updated information is different from the present information, and an ink jet printer, included in the hand-held type instrument, which prints the updated information on the medium in response to the control words. The computing type network can include a micro-computing unit which can be a microprocessor, for example, and memory units which can be RAM, ROM, etc.

49 Claims, 15 Drawing Figures

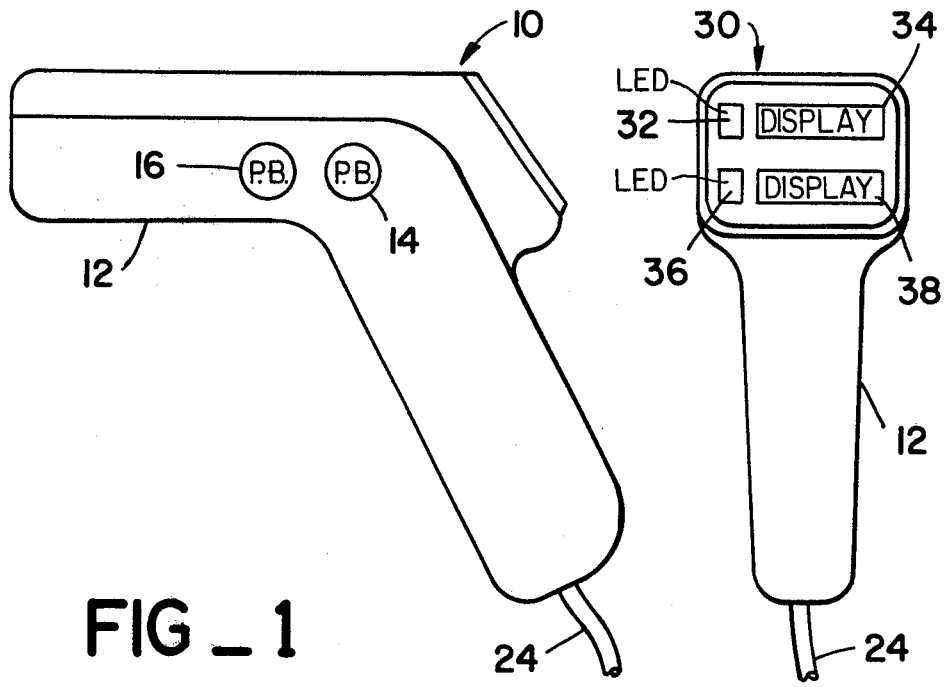
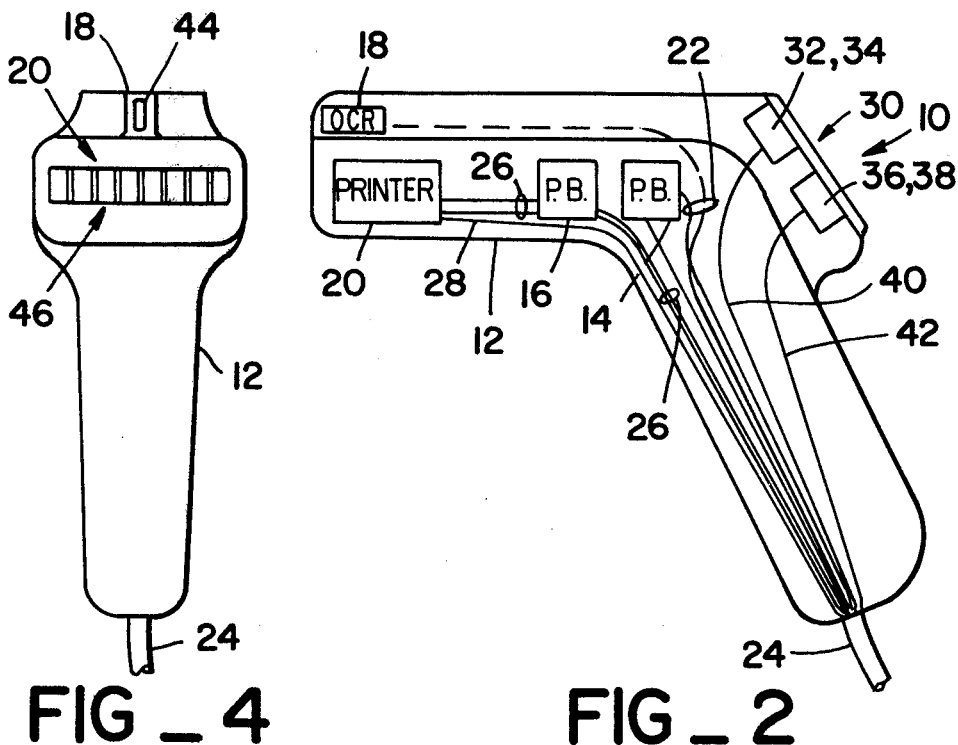
FIG_1
FIG_3
FIG_4
FIG_2

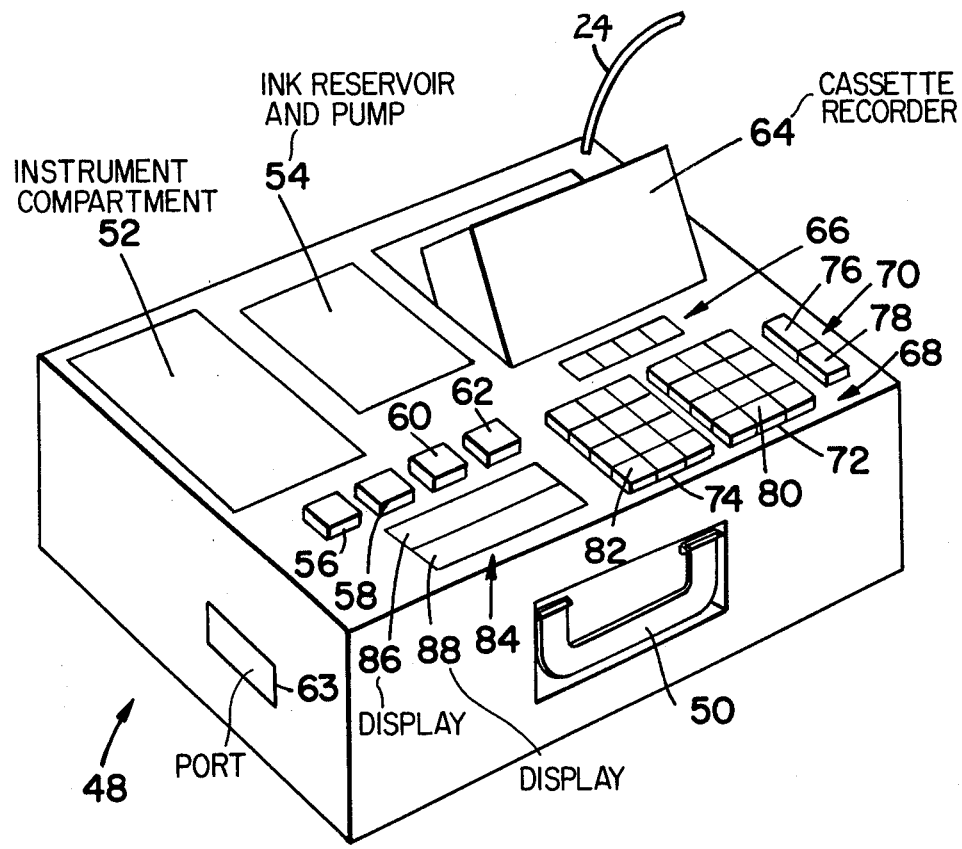
FIG_5
FIG_7

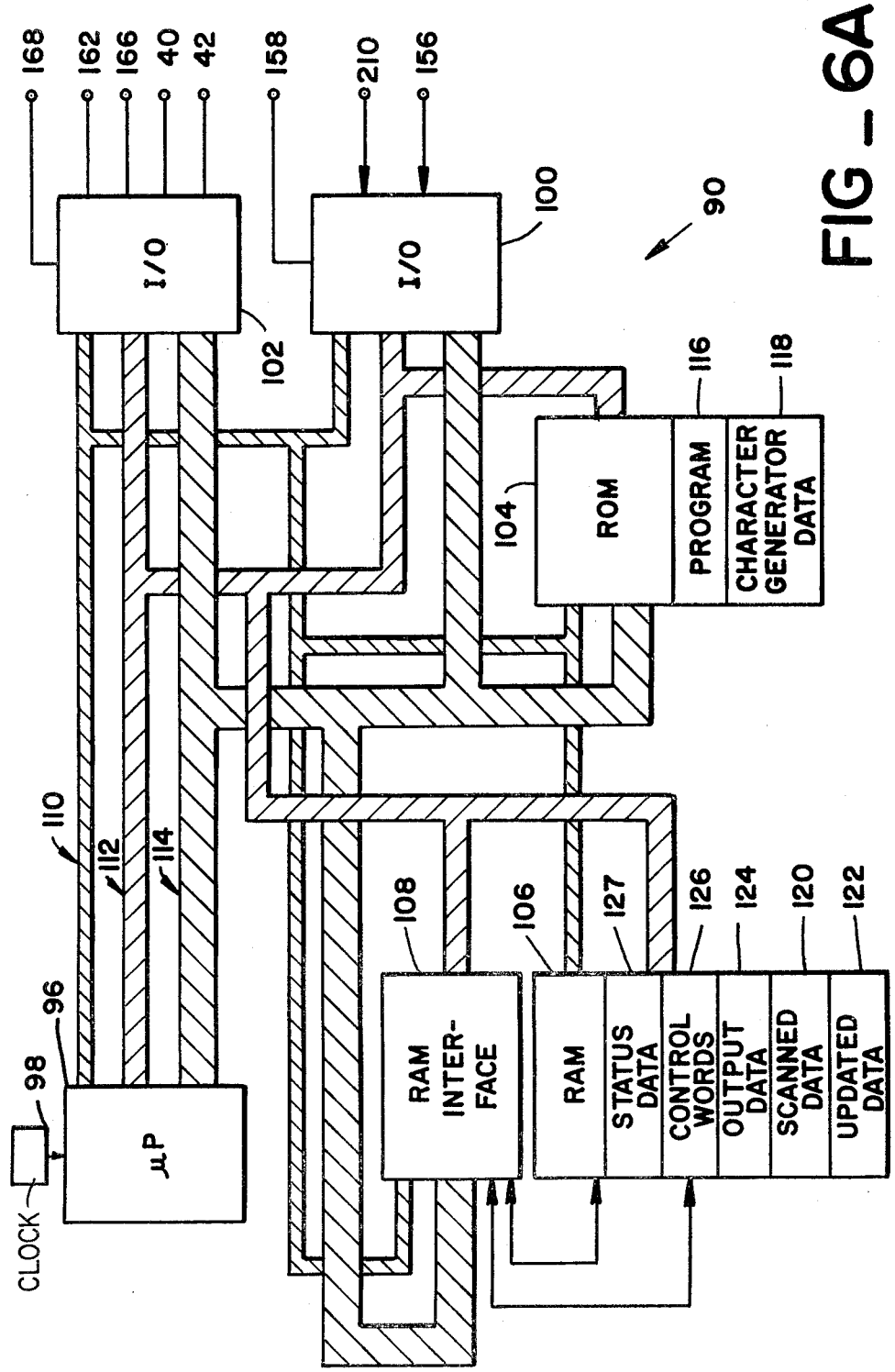
FIG_6A

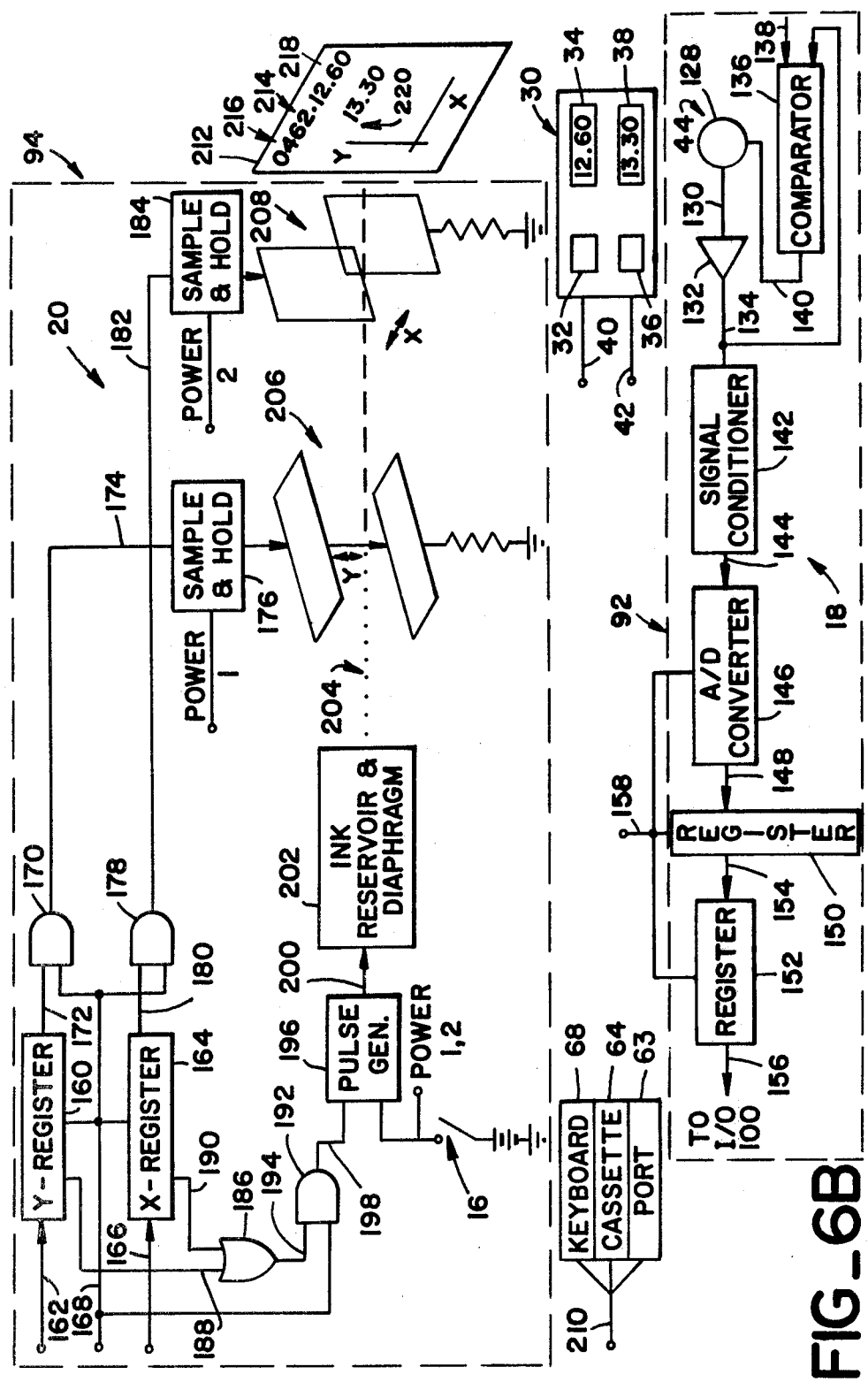
FIG_6B

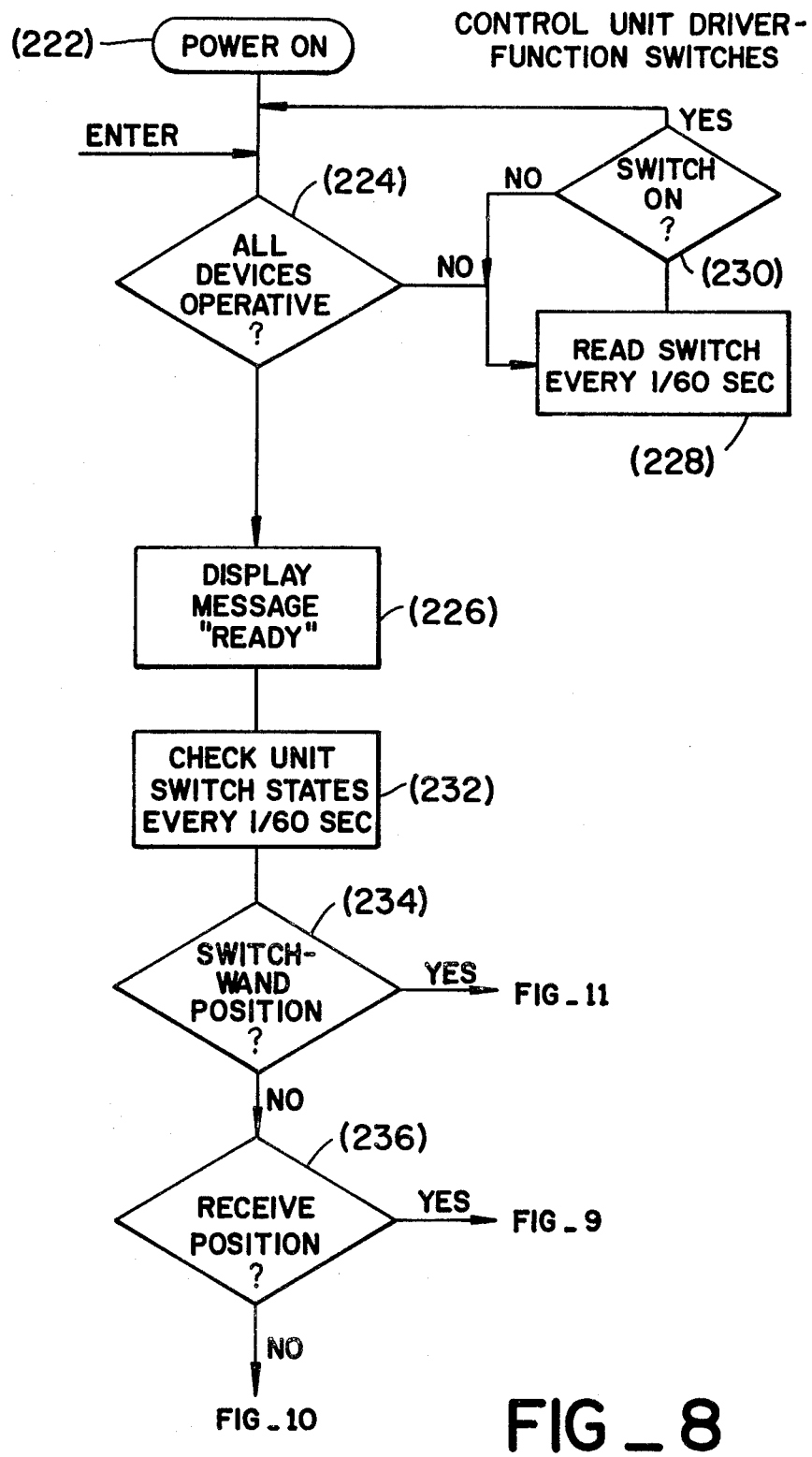
FIG_8

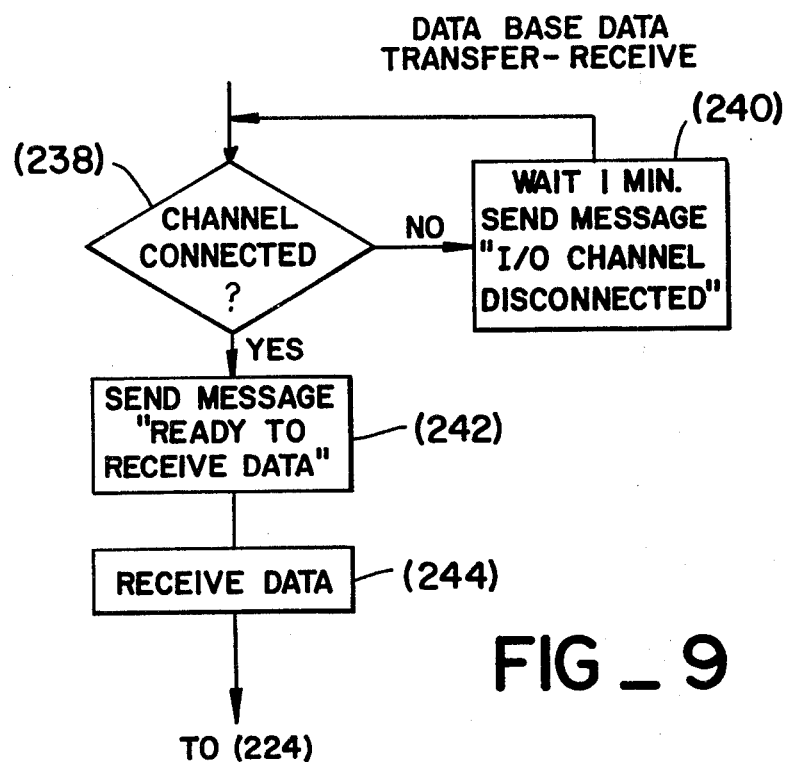
FIG_9
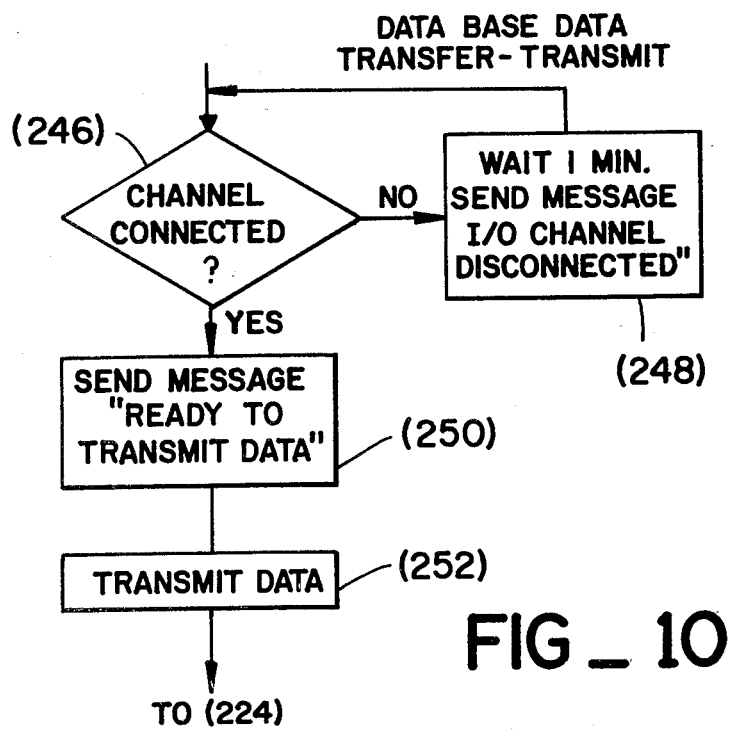
FIG_10

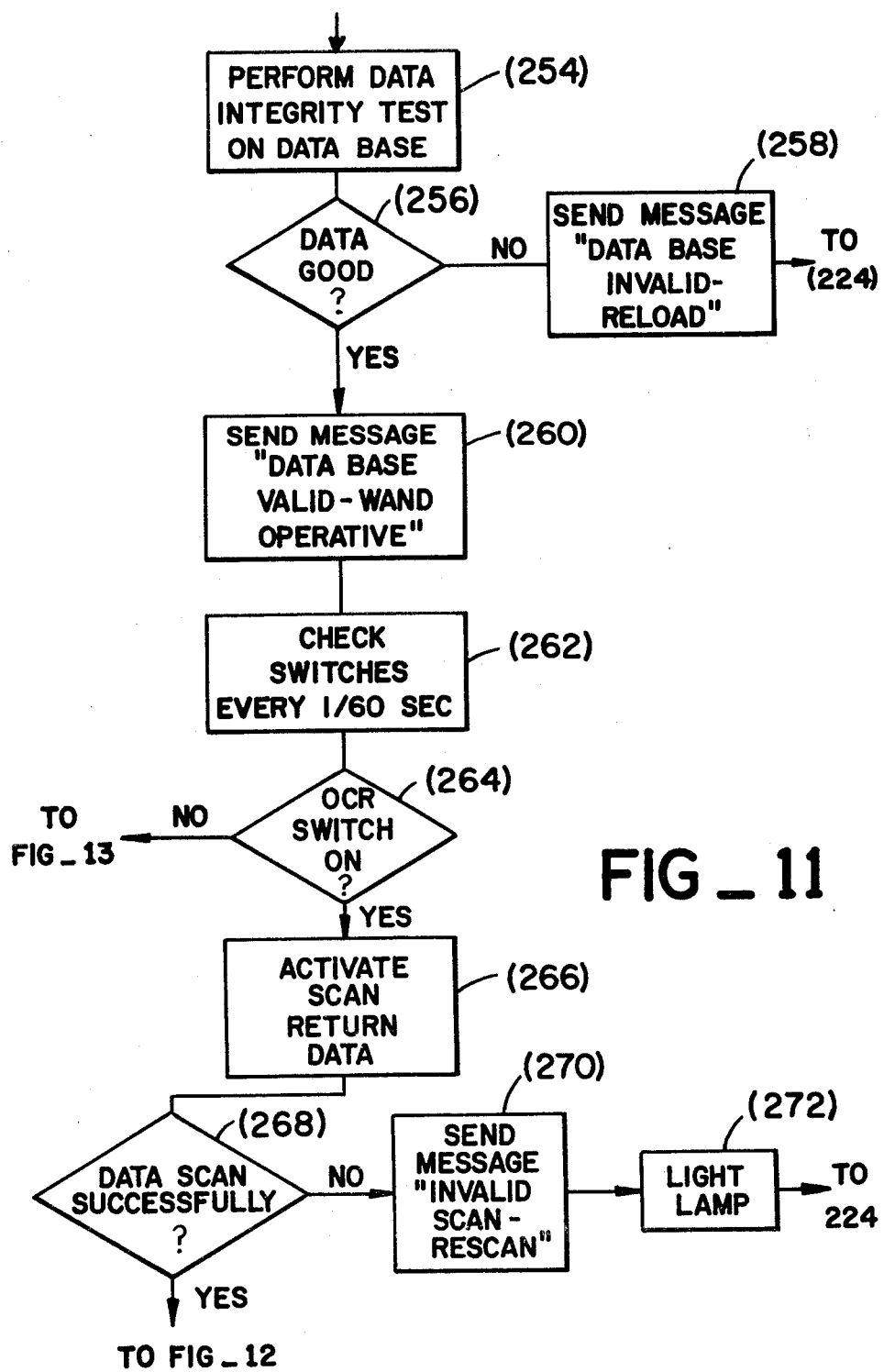
FIG_11

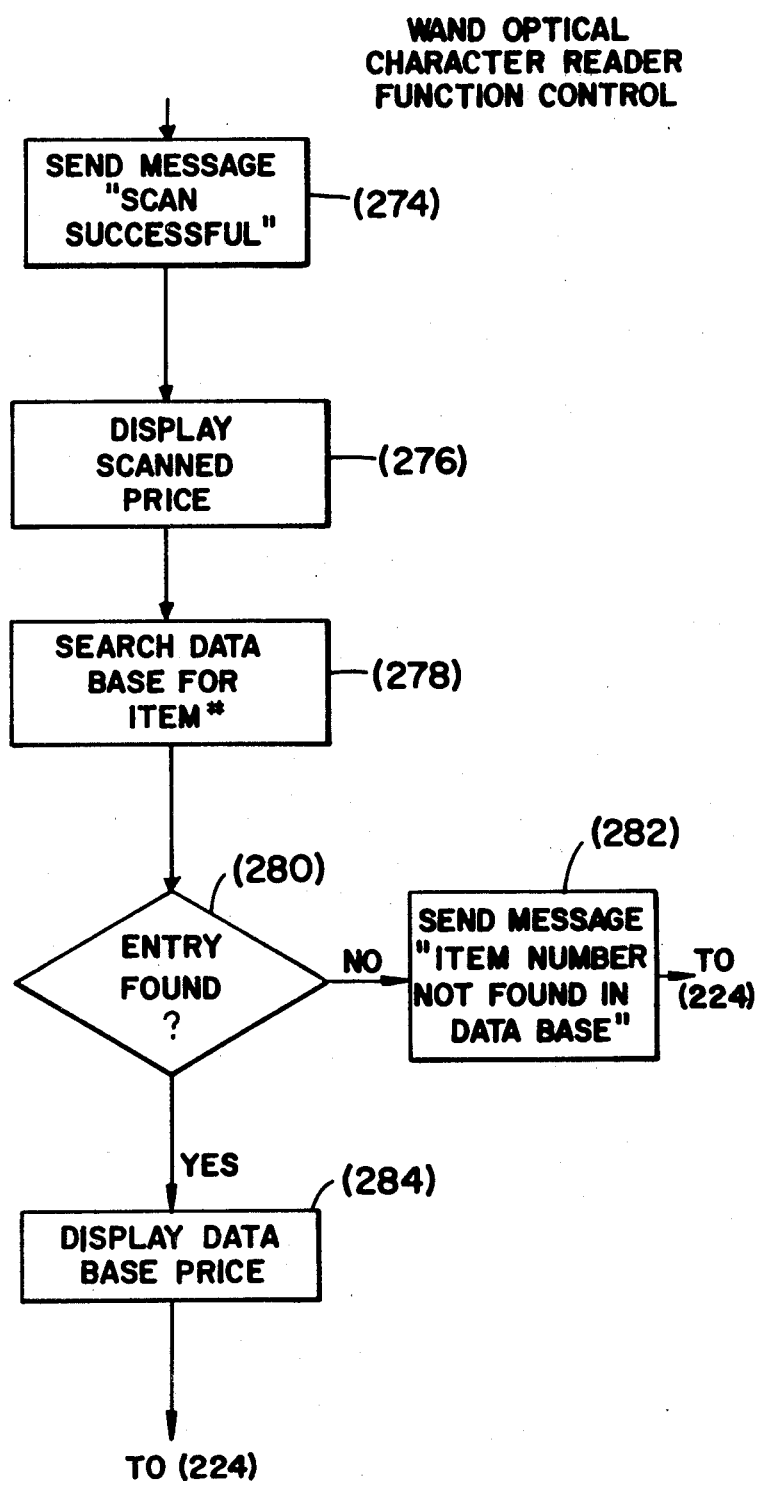
FIG_12

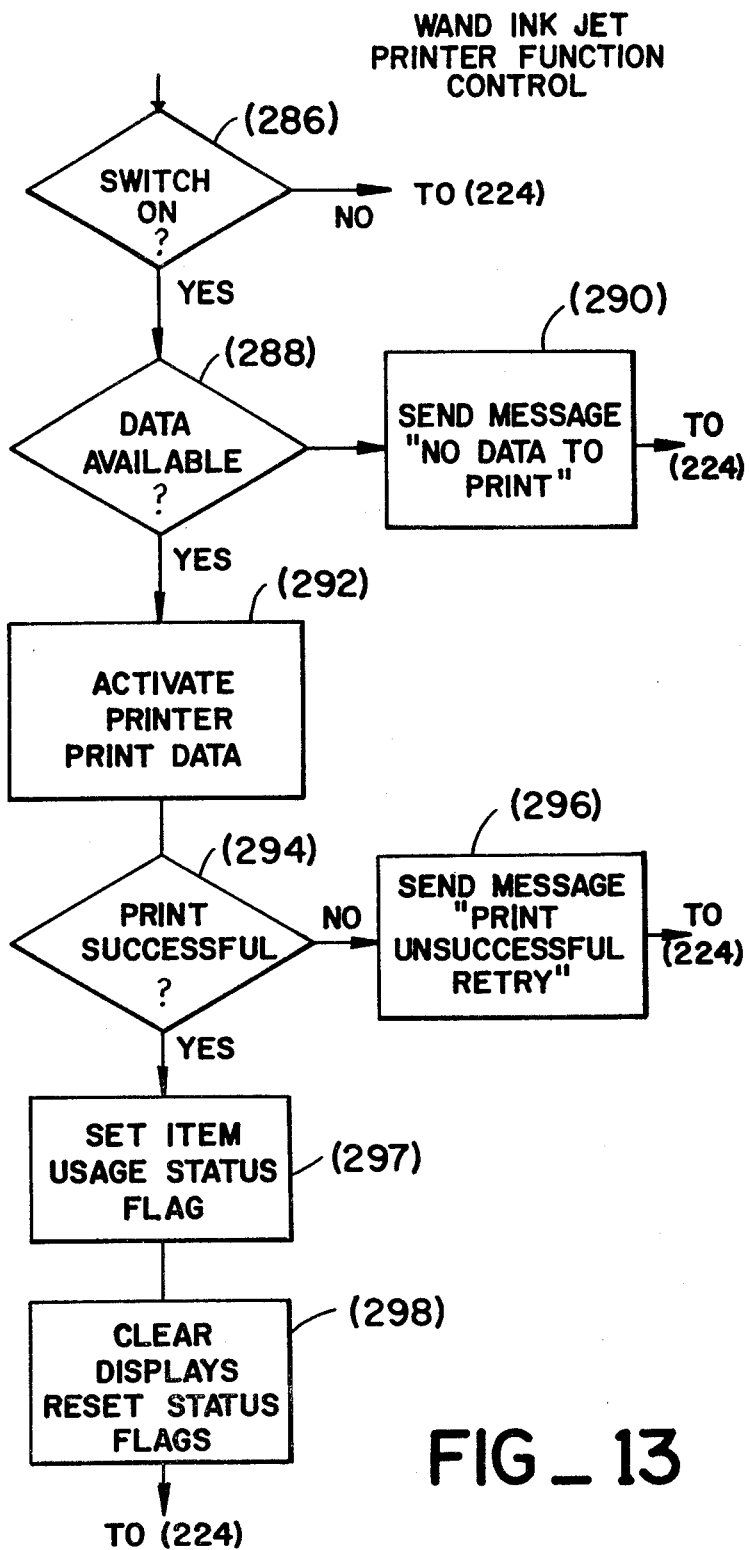
FIG_13

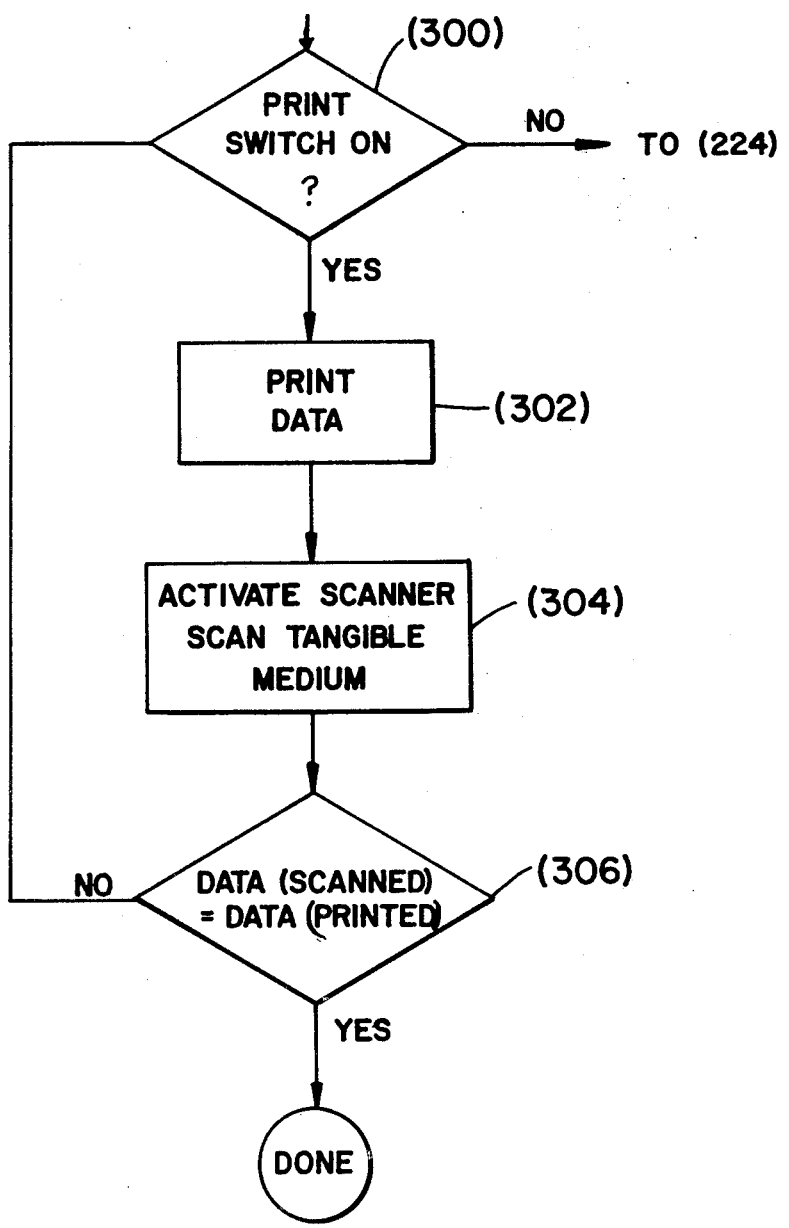
FIG_14

APPARATUS FOR PRODUCING UPDATED INFORMATION ON A TANGIBLE MEDIUM

DESCRIPTION

Background Art

This invention relates to apparatus for producing updated information on a tangible medium and more particularly to a hand-held type instrument for transferring the updated information to the medium, as needed.

In many circumstances data which is recorded on a tangible medium should be periodically checked and updated, if necessary. Typically, the data is read from the medium and compared with corresponding updated data. If a difference exists between the read data and the updated data, then the tangible medium should be modified to show the updated data. Similarly, in many circumstances updated data should be transferred onto a tangible medium where no data previously existed, i.e., a blank tangible medium.

For example, in retail clothing stores, tags or labels having pricing information are attached to the merchandise. Periodically, prices change so that these tags or labels must be examined to determine if the merchandise is correctly priced. Typically, the present pricing information on the tags is visually read and compared with updated pricing information on an inventory list. If needed, updated pricing information is placed on the merchandise by, for example, using a hand-held device to stamp out new tags which are then placed on the merchandise or by hand-writing the new pricing information onto the existing tags.

The above procedure is time-consuming, inefficient and expensive. Each step of reading, comparing and applying the updated pricing information to the merchandise requires a relatively long period of time. The procedure is inefficient because the repricing of the merchandise may require a number of man-hours, particularly if a large inventory of clothing has to be repriced. The procedure thus is costly not only in terms of the labor that is needed, but also because of the labeling apparatus and other materials that are required to update the pricing information.

Furthermore, in the design of apparatus, convenience of use and versatility can be important criteria, yet one can be a constraint on the other. For example, hand-held type instruments should be easily manipulatable by the user. In addition, such instruments preferably should perform a number of different functions to make better use of them. However, as more functions are included, more components are required and this increases the size and weight of the instruments, thereby reducing the convenience factor. More particularly, for each function to be performed, a hand-held type instrument typically will house controlled components and components that control the controlled components, each of which adds to the size and weight of the instrument. In addition, the instrument becomes more complex, and maintenance becomes more troublesome.

SUMMARY OF THE INVENTION

It is an object of the present invention to produce updated information on a tangible medium.

Another object of the present invention is to produce the updated information on the tangible medium quickly, efficiently and at low cost.

Another object of the present invention is to provide a hand-held type instrument which can be conveniently used and which can perform a number of functions.

The above and other objects are carried out in one aspect of the present invention which includes apparatus for producing updated information on a tangible medium having present data including present information, including means for acquiring the present data from the tangible medium, data processing means for processing updated data having the updated information and the present data to produce output information being the same as the updated information, and data transfer means, responsive to the output information, for transferring the updated information to the tangible medium.

In the one aspect of the invention, the present data having the present information can be acquired by, for example, optically reading this data from a tangible medium such as a tag. The data processing means then processes the present data being read with the updated data having the updated information to produce output information that is the same as the updated information. The present information and the updated information can be, for example, pricing information. The data transfer means, which can be an ink jet printer, responds to the output information to transfer, i.e., to print, the updated pricing information on the tangible medium.

The above and other objects are carried out in another aspect of the present invention which includes an instrument having a housing, first peripheral means for producing first data words having present information, programmable data processing means having centralized control and software and storing second data words having updated information, for comparing the first data words and the second data words and for generating third data control words having the updated information in response to the comparison, the data processing means being physically remote from the housing, and second peripheral means for functioning in response to the third data control words to output the updated information, the first and second peripheral means being housed in the housing.

In this other aspect of the present invention, the first and second peripheral means are peripheral to the programmable data processing means and are positioned in or on a hand-held type instrument to perform their respective functions. The programmable data processing means produces control information on control lines to control the first peripheral means to produce the first data words, and produces control information in response to the comparison of the first and second data words in the form of the third data words that are transferred over data lines to control the second peripheral means. Consequently, with the control being centralized in the data processing means, the first and second peripheral means do not have conventional control components, thereby, for example, reducing the size, weight and complexity of these peripheral means for convenient implementation in a hand-held instrument while providing for a number of functions.

The above and other objects are carried out in yet another aspect of the present invention which includes apparatus for producing updated information on a blank tangible medium, including data processing means for storing and for outputting output information being the same as the updated information, data transfer means, responsive to the output information, for transferring the updated information onto the tangible medium, and means for acquiring the transferred updated information from the tangible medium, said data processing means including means for comparing the stored output information with the acquired updated information to determine if the updated information has been properly transferred onto the blank tangible medium.

In this yet other aspect of the invention, the blank tangible medium can be, for example, an electronic component such as an integrated circuit chip, transistor, resistor, or capacitor, etc., or a drug capsule, pill or blank garment tag, which are to have imprinted a part number. The ink jet printer can respond to the stored output information corresponding to the part number to print such number on the electronic component. Then, the printed part number can be optically read and compared with the stored information in the data processing means to determine if, for example, it has been legibly printed.

BRIEF DESCRIPTION OF THE DRAWINGS

FIG. 1 is a side elevation of a hand-held type instrument of the present invention.

FIG. 2 is a cut-away side view of the components of the hand-held type instrument of FIG. 1.

FIG. 3 is a rear elevation of the hand-held type instrument of FIG. 1.

FIG. 4 is a front elevation of the hand-held type instrument of FIG. 1.

FIG. 5 is a view, in perspective, of a portable control unit of the present invention.

FIGS. 6A and 6B are schematic illustrations of the electronics of the present invention.

FIG. 7 is an illustration of control words used in the present invention.

FIGS. 8-14 are flow diagrams of software of the present invention.

DETAILED DESCRIPTION OF THE INVENTION

FIG. 1 and FIG. 2 illustrate a hand-held type instrument or wand 10 having a housing 12 which supports, externally, a push button switch 14 and a push button switch 16. Internally, the housing 12 supports an optical character reader 18 and an ink jet printer 20. Power and data lines 22 are coupled to push button switch 14 and optical character reader 18 and extend into a flexible housing 24 leading from the hand-held type instrument 10. Power and data lines 26 are coupled to the push button switch 16 and ink jet printer 20 and also lead into the housing 24. A conduit 28 extends from the housing 24 to the ink jet printer 20 to supply ink to the printer 20.

With reference to FIG. 2 and FIG. 3, the housing 12 of the instrument 10 also supports a display 30 having a light emitting diode (LED) signal lamp 32, an 8-character LED display screen 34, an LED signal lamp 36 and an 8-character LED display screen 38. Power and data lines 40 are coupled from the housing 24 to the signal lamp 32 and display screen 34, while power and data lines 42 are coupled from the housing 24 to signal lamp 36 and display screen 38.

As illustrated in FIG. 4, the optical character reader 18 has an eye 44 to scan data on a tangible medium to be described below. The ink jet printer 20 has a plurality of nozzles 46, e.g. eight, to transfer data onto the tangible medium.

As will be described below, the hand-held type instrument 10 can be operated to perform different functions. Basically, one operation involves printing updated information on a tangible medium which already has present information on it. Another operation involves printing updated information on a blank tangible medium. As will become apparent, the same hand-held type instrument 10 can be used to perform a number of other functions merely by different program control.

In the one operation of the instrument 10, when the switch 14 is depressed, the optical character reader 18 is activated to acquire data by scanning and optically reading the data on the tangible medium and then producing data words which are carried over data lines 22. For example, and as will be further described, the data being read can be a stock number identifying a piece of merchandise or a vendor number, and present pricing information associated with that stock number. When switch 16 is depressed, the ink jet printer 20 is activated to transfer updated or new pricing information for that stock number onto the tangible medium. The printer 20 is controlled by control words being received on the data lines 26 to print the updated information on the tangible medium.

If, after scanning the tangible medium, the optical character reader 18 produces data on data lines 22 that is bad, e.g. data which is noisy or unintelligible, the signal lamp 32 will flash to indicate that an improper scan has been made. If, after the scan, the signal lamp 32 does not flash, good data has been acquired, e.g. data which is not noisy or unintelligible, and the present pricing information read by the reader 18 is transferred over data lines 40 and displayed on the screen 34.

If the acquired data is good, but the stock number being scanned is not part of a data base stored elsewhere than in instrument 10, as will be described below, then signal lamp 36 will flash and no updated pricing information will be displayed on screen 38. If the stock number is in the data base, the signal lamp 36 will not flash. Then, the updated pricing information for this stock number is received over data lines 42 and displayed on screen 38 simultaneously with the present pricing information being displayed on screen 34. Should the updated pricing information differ from the present pricing information, the push button switch 16 can be depressed to activate the printer 20 and transfer this updated pricing information onto the tangible medium.

FIG. 5 shows a portable control unit 48 which can be carried by gripping a handle 50 or by being strapped around a shoulder of a user with a strap (not shown). The control unit 48 receives the housing 24 and has a compartment 52 for storing the hand-held type instrument 10, as well as an ink reservoir and pump 54 for pumping ink through the conduit 28. The control unit 48 can be either battery powered or connected to a A/C outlet for power.

Control unit 48 has a power on/off switch 56 which, when turned on, powers up the control unit 48 and the hand-held type instrument 10. A three-position Input/Output control switch 58, a two-position Input/Output data channel select switch 60 and a control unit reset switch 62 also are on the control unit 48. A conventional Input/Output port jack connection 63 is on the side of the control unit 48 to permit direct hook-up of the unit 48 to a remote computer (not shown) so that data can be transferred between memory in the unit 48 and the remote computer. A cassette recorder 64 is also on the unit 48 and has conventional cassette recorder control buttons 66 so that data can be transferred between the recorder tape and memory in the unit 48.

Switch 58 has the three positions, one position being for control unit 48 to receive data in memory, a second position to transmit data from memory, and a third position for transferring data between memory and instrument 10. Switch 60 has the two positions, a first position being for the transfer of data between memory and the remote computer and the second position being for transfer of data between memory and cassette recorder 64.

Thus, with the power switch 56 turned on, and switch 60 in the first positon, data can be received in memory of the control unit 48 through connection 63 when switch 58 is in the receive position and data can be transmitted from memory in unit 48 through connection 63 when switch 58 is in the transmit position. When switch 60 is in second position, data can be received in memory of the control unit 48 from cassette recorder 64 when switch 58 is in the receive position and data can be transmitted from memory in unit 48 to recorder 64 when switch 58 is in the transmit position. When switch 58 is in the third position, data can be transferred between memory and instrument 10.

The control unit 48 also has a keyboard 68 having a key pad group 70, a key pad group 72 and a key pad group 74. Key pad group 70 has a delete key 76 and a data enter key 78. Key pad group 72 has a number of numeric keys 80 including keys numbered 0-9, and key pad group 74 has a number of function keys 82.

Keyboard 68 is used to enter data into the control unit 48 when the present data being scanned by optical character reader 18 is, for example, unintelligible. The data on the tangible medium may be unintelligible because, for example, it is partially obscured or otherwise incapable of being read. This data on the tangible medium can then be stored in memory in the control unit 48 by depressing the appropriate keys 80 and keys 82. For example, the data on the tangible medium that should be entered first is a stock number of a piece of merchandise. To do this, the appropriate numeric keys 80 are depressed to produce data of the stock number, followed by depressing one of the function keys 82 identifying this number as a stock number. Then, the data enter button 78 is depressed to enter this data into memory. Then, the pricing information of the present data should be entered and this is accomplished by depressing the appropriate numeric keys 80 corresponding to the pricing information, followed by depressing another function key 82 indicating that this number is pricing information. Then, the data enter button 78 again is depressed to enter this data. If one of the keys 80 or one of the keys 82 is incorrectly depressed, the delete button 76 is depressed to erase the data so that the proper information can then be entered.

An LED visual display unit 84 on the control unit 48 has an LED row 86 and an LED row 88, each of which can display, for example, sixty-four characters. Visual display unit 84 is used to display a variety of messages, as will be described in connection with the flow diagrams of FIGS. 8-14.

Before discussing FIGS. 6A and 6B, it will be helpful to define various terms. The term data processing means is a generic reference to a computing system. The term bus oriented computing type network refers to a network having a bus (control, data and address) which allows the interconnection of specific elements or components of the data processing means. The term micro-computing unit refers to a specific unit which can contain a clock, arithmetic logic unit, program counter, etc. arranged in its own network structure on separate chips or on an integrated unit on a single chip. A microprocessor is an example of a micro-computing unit with its components integrated on a single chip. The term memory unit is on the same level as a micro-computing unit and examples include RAM, ROM and EPROM. The memory unit can be integrated into a single chip, e.g., a RAM-ROM chip, containing both; or into separate chips, e.g., RAM and ROM occupy separate chips.

FIGS. Reference now will be made to FIG. 6A and FIG. 6B. The former shows a data processing means 90, particularly a but oriented computing type network that is contained in the control unit 48.

As will be shown, the computing type network 90 contains: a micro-computing unit which, for example, can be a microprocessor; a memory unit which, for example, can be comprised of random access memory (RAM), read only memory (ROM); and input-output control ports. These elements of the computing type network 90 can be connected by, for example, a data bus, address bus and control bus.

FIG. 6B shows a peripheral device 92, in particular the optical character reader 18, which is contained in the hand-held type instrument 10, is optoelectric in implementation and is under control by the computing type network 90. A peripheral device 94, in particular the ink jet printer 20, is stored in the hand-held type instrument 10 and is under control by the computing type network 90. As will be shown, the control of the peripheral device 92 and the peripheral device 94 is centralized in the computing type network 90 and is carried out with software.

The network 90 has a micro-computing unit 96, which can be a microprocessor, which is clocked by a clock 98, an Input/Output device 100, an Input/Output device 102, a read only memory or ROM 104, a random access memory or RAM 106 and a RAM interface 108. Communication amongst these components of the computing type network 90 is performed over a control bus 110, an address bus 112 and a data bus 114.

ROM 104 has address space 116 for storing the software for performing the functions to be described. ROM 104 also has address space 118 for storing character generator data in the form of 8-bit, data control words. For example, a number of 8-bit, data control words are stored in address space 118 to produce the character number 1, a number of 8-bit, data control words are stored in address space 118 to produce the character number 2, etc.

RAM 106 has address space 120 to store present data scanned from the tangible medium, address space 122 to store updated data as a data base, address space 124 to store output data, address space 126 to temporarily store the data control words from ROM 104 and address space 127 to store status data which will be described more fully below.

The peripheral device 92, i.e., the optical character reader 18, has at least one photocell 128, but can have a multiplicity of photocells, at the eye 44 which converts optical information being scanned to voltage signals on an output line 130. The voltage signals are amplified by an amplifier 132 and supplied on a line 134. A comparator 136 compares the amplified voltage signals on line 134 to a preset voltage threshold on a line 138. The output signal of comparator 136 is produced on a line 140 in response to any difference between the voltage signals on line 134 and the threshold on line 138, and controls the light sensitivity of the photocell 128.

A signal conditioning circuit 142 conditions the amplified voltage signals on line 134, such as by removing noise, and sends the signals over a line 144 to an analog-to-digital converter 146. Converter 146 converts the analog voltage signals on line 144 into 8-bit data words on a line 148 which are loaded in parallel into an 8-bit register 150. Each 8-bit data word in register 150 is then serially loaded into an 8-bit register 152 over a line 154. A data line 156 is coupled between the register 152 and I/O device 100 to transfer each data word shifted out of register 152 to the computing type network 90. A control line 158 carries clock pulses from the I/O device 100 to control sampling by the A/D converter 146 and the shifting of the data words into and out of register 152.

The peripheral device 94, i.e., the ink jet printer 20, has a Y-deflection register 160 which stores the data control words that are received over a data line 162 from the I/O device 102 of computing type network 90. An X-deflection register 164 stores the data control words which are received from the I/O device 102 over a data line 166. The data control words are clocked into and out of register 160 and register 164 with clock pulses being received over a control line 168 that is coupled to the I/O device 102.

An AND-gate 170 has one input connected to the register 160 over a line 172 and another input connected to the line 168. The output of gate 170 is coupled over a line 174 to a sample and hold circuit 176. An AND-gate 178 has one input coupled to register 164 over a line 180 and another input coupled to the line 168. The output of gate 178 is coupled over a line 182 to a sample and hold circuit 184. An OR-gate 186 has one input coupled to one stage of register 160 over a line 188 and another input coupled to one stage of register 164 over a line 190. An AND-gate 192 has one input coupled to the output of gate 186 over a line 194 and another input coupled to the line 168.

A pulse generator 196 is powered on closure of the switch 16 and is activated by the output of gate 192 over a line 198. In response to the output on line 198, pulse generator 196 produces a pulse signal on an output line 200 to vibrate a diaphram-type ink reservoir 202 which then produces droplets of ink 204. A pair of Y-deflection plates 206 deflect the droplets of ink 204 in the Y-direction in response to the signal stored in sample and hold circuit 176. A pair of X-deflection plates 208 deflect the droplets of ink 204 in the X-direction in response to the signal stored in sample and hold circuit 184.

It should be noted that the components of ink jet printer 20 shown in FIG. 6B, except for switch 16, are duplicated for each of the eight nozzles 46. Consequently, there are eight sets of such components for the entire printer 20.

FIG. 6B also shows the port connection 63, cassette recorder 64 and keyboard 68. Data is transferable over a data line 210 between these components and memory 106 via I/O device 100 in the manner indicated above.

FIG. 6B also illustrates, as one example, a tangible medium 212 which may be a tag or label on merchandise such as a garment. The tangible medium 212 has present data 214 having function data 216 and pricing information 218. As an example, the function data 216 is a stock number shown as 0462. The present pricing information 218 is shown as 12.60. Tangible medium 212 also shows updated data 220 in the form of updated pricing information which is transferred to the medium 212 by ink jet printer 20. In the example shown, the new pricing information is 13.30.

FIG. 6B also shows the display 30 which is controlled by signals being received on the data line 40 and data line 42 from I/O device 102.

FIG. 7 discloses an example of two data control words of 8-bit length, one for the X-deflection and one for the Y-deflection. The most significant bit of each data control word is gated through gate 186 and gate 192 to activate pulse generator 196 if either bit is a logic 1. The seven least significant bits of each data control word represent the amount of ink drop deflection and these bits are gated through respective gates 170, 178 to produce deflection voltage signals in respective circuits 176, 184 corresponding to this amount.

The overall operation of the present invention will now be described with further details given in connection with FIGS. 8-13. Assume that updated data has been received and is stored in address space 122 of RAM 106, either via port connection 63 or cassette recorder 64. Also assume that the instrument 10 is being hand-held and directed at the tag 212.

A scan of the present data 214 is then performed by depressing the switch 14 to activate the optical character reader 18. As the photocell 128 is moved across the present data 214, voltage signals ultimately are produced on line 144 which represent the numbers of the function data 216 and the pricing information 218. The micro-computing unit 96 activates the I/O device 100 and transmits clock pulses from clock 98 through device 100 onto line 158 via the control bus 110. Therefore, 8-bit data words having information of the scanned present data 214 are serially coupled over data line 156 to device 100 which is addressed by address signals on the address bus 112 from the micro-computing unit 96. These data words are then coupled through I/O device 100 onto the data bus 114 and then through RAM interface 108 for storage in address space 120 of RAM 106.

Then, micro-computing unit 96 addresses the RAM 106 to search the data base of updated words in address space 122 for an updated data word having the same stock number as function data 216 stored in space 120.

Assume that the function data 216 is in the data base; therefore, micro-computing unit 96 does not produce any signal on data bus 114 to energize LED 36 via data line 42. Micro-computing unit 96 also addresses the ROM 104 to fetch the data control words stored at address space 118 for producing the characters of the updated pricing information 218 and temporarily stores these in address space 126 of RAM 106. Also, micro-computing unit 96 fetches the data words in address space 120 corresponding to the present pricing information and the data words in address space 122 corresponding to the updated pricing information, and then activates I/O device 100 to couple these data words onto data lines 40, 42 to display this information on screens 34, 38.

As indicated in FIG. 6B, the updated pricing information is different from the present pricing information 218. Consequently, the updated pricing information should be transferred onto the tangible medium 212 as shown by data 220. To do this, the switch 14 is opened and the switch 16 is depressed to activate the ink jet printer 20.

Then, pairs of 8-bit data control words are fetched from address space 126 of RAM 106 and transferred or outputted over data bus 114 through I/O device 102. Each pair has an X-deflection word and a Y-deflection word such as is shown in FIG. 7. The Y-deflection word is then transferred onto data line 162 and clocked into Y-deflection register 160, while the X-deflection word is transferred onto data line 166 and clocked into X-deflection register 164. These outputted data control words constitute the same information as the updated pricing information.

Then, the seven least significant bits stored in register 160 and register 164 are clocked through gate 170 and gate 178 respectively to sample and hold circuit 176 and sample and hold circuit 184. As a result, circuit 176 and circuit 184 hold a control voltage, proportional to the value of the words in register 160 and register 164, to cause deflection plates 206 and deflection plates 208 to deflect a drop of ink by a corresponding amount.

The most significant bits stored in register 160 and register 164 are gated through OR-gate 186 to gate 192. If either of these most significant bits is a logic 1, this is clocked through gate 192 to activate pulse generator 196 and cause reservoir 202 to emit droplets of ink 204 which are deflected by the plates 206 and plates 208. This process continues for each of the eight nozzles 46 so that ultimately the characters 13.30 are transferred or written onto tangible medium 212 in accordance with the updated pricing information and without having to move the printer 20.

If the present pricing information displayed on screen 34 and the updated pricing information displayed on screen 38 are the same, then of course the ink jet printer 20 need not be activated. Another similar tag 212 on another piece of merchandise can then be scanned in the same manner to see if the screen 34 and screen 38 display different pricing information. If so, then ink jet printer 20 can be activated to transfer the updated pricing information to the tangible medium in the same manner.

The micro-computing unit 96 also is programmed to store in address space 127 of memory 106, for example, the number of merchandise items for which updated pricing information is printed on the tags 212. This is the status data prreviously mentioned.

If the present data 214 is partially obscured or otherwise cannot be scanned properly, then the data processor means 90 will not be able to process this information. After receiving the insufficient information on data line 156, the microcomputing unit 96 produces a signal on data bus 114 which is transmitted through I/O device 100 onto data line 40 to activate the LED 32. Then, the keyboard 68 is utilized to enter the present data 214 into the data processor means 90. As a result, sufficient information is now available to be able to print updated pricing information 220 on tangible medium 212, if needed, in the same manner described above as if the scan were good.

FIGS. 8–13 show a flow diagram of the present invention. As will be described, a number of messages can be displayed on visual display unit 84 during execution of the program. All of these messages are prestored in ROM 104 and fetched by micro-computing unit 96 for display on unit 84 under program control.

With respect to FIG. 8, which shows a "Control Unit Driver-Function Switches" routine, the process starts by turning the power on (222). If the hand-held type instrument 10 and control unit 48 are operative (224), then control is transferred to block (226) to display a message "READY" on visual display unit 84. If the instrument 10 or unit 48 is not operative, control is transferred to block 228 to read the reset button 62. If the reset button is on (230) and resets the instrument 10 or unit 48 to make them operative, the message "READY" is displayed (226). If the button 62 is not depressed (230), it is read (228) again.

After the message "READY" is displayed (226), the switch 58 and switch 60 are read (232). If switch 58 is read and in the wand or third position (234), then the program exits to a "Wand Function Control" routine of FIG. 11. If the switch 58 is not in the wand position (234) and is in the receive position (236), then the program exits to a "Data Base Data Transfer-Receive" routine of FIG. 9. If the switch 58 is not in the wand position (234) or the receive position (236), then the program exits to a "Data Base Data Transfer-Transmit" routine of FIG. 10.

If the switch 58 is in the receive position (236) then, as shown in FIG. 9, control moves to block 238. If port connection 63 is not connected due to the position of switch 60, then a message (240) "I/O Channel Disconnected" is displayed on visual display unit 84. If the port connection 63 is connected (238) due to the position of switch 60, then a message (242) "READY TO RECEIVE DATA" is displayed on visual display unit 84. Then, the control is transferred to block (244) to receive data for storage in RAM 106 and the program then enters the routine of FIG. 8 at block 224.

If the switch 58 is not in the wand position (234) or the receive position (236), control is transferred to the routine of FIG. 10. If the port connection 63 is not connected (246), control is transferred to block (248) to produce a message "I/O CHANNEL DISCONNECTED" on the visual display unit 84. If the port connection 63 is connected (246), a message "Ready To Transmit Data" (250) is displayed on the visual display unit 84. Next, the data in RAM 106 is transmitted (252) and the program enters the routine of FIG. 8 at block 224. A similar procedure, though not shown, can be constructed by a skilled software programmer to control the transmission and reception of data between the cassette recorder 64 and computing type network 90.

If the switch 58 is in the wand position (234), the program exits to the routine of FIG. 11. First, a data integrity test (254) is performed on the data base stored in address space 122 of RAM 106. A data integrity test looks for specific control data at specific locations in address space 122 of RAM 106. If such data is not found, the data is presumed invalid. If the data base is not valid or established (256), for example, unintelligible, a message "Data Base Invalid-Reload" (258) is sent to the visual display unit 84 and the program reenters at block 224 of the routine of FIG. 8.

If the data base is valid or established (256), a message "Data Base Valid-Wand Operative" (260) is sent to the display unit 84. Next, the switch 14 and switch 16 are read (262). If the switch 14 is not on (264), the program exits to a "Wand Ink Jet Printer Function Control" routine shown in FIG. 13. If the switch 14 is on (264), control is transferred to block (266) of FIG. 11. The optical character reader 18 is activated and a scan can then be made to produce data. If the data scan is not successful (268), for example the data acquired is unintelligible, a message "Invalid Scan-Rescan" (270) is sent to the visual display unit 84. Also, lamp 32 is flashed to indicate an invalid scan (272) and the program exits to block 224 of FIG. 8. If the data scan is successful (268), the program exits to a "Wand Optical Character Reader Function Control" routine shown in FIG. 12.

In FIG. 12, control is transferred to block (274) to display the message "Scan Successful" on visual display unit 84, as well as the function data, e.g., stock number that was scanned. Then, in accordance with block (276), the scanned price is displayed on screen 34. Next, control is transferred to block (278) to search the data base for the stock number. If an entry in the data base is not found (280), a message "Item Number Not Found In Data Base" (282) is displayed on display unit 84 and lamp 36 is flashed, and the program exits to block 224 of FIG. 8. If an entry is found in the data base (280), control is transferred to block (284) and the data base price is displayed on screen 38. The program then exits to block 224.

If the switch 14 is not on (264), the program exits to the routine of FIG. 13. If the switch 16 is not on (286), the program exits to block 224 of FIG. 8. If the switch 16 is on (286), but no data is available (288), then control is transferred to block (290) to produce the message "No Data To Print-Scan" on the visual display unit 84 and the program exits to block 224. If data is available (288), the printer 20 is activated (292) to print the updated pricing information. If, for some reason, the printing is not successful (294), a message "Print Unsuccessful-Retry" (296) is displayed on unit 84 and the program exits to block 224 of FIG. 8. If the printing is successful (294), an item usage status flag in the data base is set for the stock number scanned (297), and then the unit 48 is reset in preparation for the next scan (298) with the program entering at block 224.

As already indicated, the hand-held type instrument or Wand 10 can also be operated to print updated information on a blank tangible medium. This is accomplished merely by adding a program subroutine to carry out this operation. The blank tangible medium can be, for example, electronic components, blank garment price tags which are to have part numbers or inventory and price data printed on them, respectively.

In a manner already indicated, control unit 48 can be activated under program control to store only the part number in memory 106, either from the remote computer (not shown) or from the cassette recorder 64 or from the keyboard 68. Then, the hand-held type instrument 10 can be operated under program control as shown in FIG. 14. If the print switch 16 is not on (300), the program exits to block 224. If the print switch 16 is on (300), control moves to block 302. The part number data stored in memory 10 is then used by micro-computing unit 96 to fetch the data control words from ROM 104 which are then fed to printer 20 in a manner already indicated. Then, printer 20 prints the part number or updated information onto the blank tangible medium, electronic component or blank price tag, for example.

Then, program control is transferred to block 304 to activate the scanner 18. Next, the part number or updated information printed on the tangible medium is scanned, resulting in the scanned data being stored in memory 106. Next, micro-computing unit 96 compares the part number previously entered in memory 106 with the scanned part number entered in memory 106. If the two compare (306), the part number has been properly, e.g., legibly, printed on the tangible medium and the routine is finished. If not, control returns to block 300.

In summary, updated data can be easily, quickly and inexpensively transferred onto a tangible medium by using instrument 10 and control unit 48 in the manner described.

Moreover, control for the printer 20 and optical character reader 18 are centralized in the bus oriented computing type network 90. For example, the control needed to control printer 20 is in the form of data control words that are stored in ROM 104. These are transmitted to printer 20 over simple data lines, which means that printer 20 need not have its own conventional control components. Consequently, with the control being centralized, printer 20, as well as optical character reader 18, can be conveniently housed in instrument 10 which thus can be conveniently manipulated.

Furthermore, while instrument 10 is a hand-held type instrument, it can be fixed on a support to perform the printing and scanning functions. For example, if the instrument 10 is used to print and then scan the printed data, it can be fixed in an assembly area and the tangible medium, electronic component, blank tag, etc. can be then fixed on an aligned support. The instrument 10 can then be operated as just mentioned.

Still furthermore, by providing different program control, the instrument 10 can be operated to perform other functions tailored for specific applications. This adds to the flexibility and usefulness of the instrument.

We claim:

1. Apparatus for producing updated information on a tangible medium having present data including present information, comprising:
   (a) opto-electric means for acquiring the present data having the present information from the tangible medium;
   (b) data processing means for storing updated data having the updated information and for comparing the present data and the updated data to produce output information being the same as the updated information; and
   (c) data transfer means, responsive to the output information, for transferring the updated information to the tangible medium.

2. Apparatus according to claim 1 wherein said opto-electric means for acquiring comprises:
   (a) means for reading the present data and for producing analog signals representing the present data being read; and
   (b) means for converting the analog signals to digital signals and for transferring the digital signals to said data processing means.

3. Apparatus according to claim 2 wherein said means for reading comprises means for scanning the present data.

4. Apparatus according to claim 3 wherein said means for scanning comprises an optical scanner.

5. Apparatus according to claim 4 wherein said optical scanner comprises a photocell.

6. Apparatus according to claim 5 wherein said optical scanner further comprises means for adjusting the sensitivity of said photocell.

7. Apparatus according to claim 2 wherein said means for converting and for transferring comprises:
   (a) an analog-to-digital converter for producing the digital signals; and
   (b) storage register means, connected to said converter, for storing the digital signals.

8. Apparatus according to claim 1 wherein said data processing means comprises programmable bus oriented computing type network means.

9. Apparatus according to claim 1 wherein said data transfer means comprises means for writing the updated information onto the tangible medium.

10. Apparatus according to claim 9 wherein said means for writing comprises:
   (a) means for printing the updated information; and
   (b) means, responsive to the output information, for controlling said printing means.

11. Apparatus according to claim 1 wherein said data processing means comprises programmable bus oriented computing type network means for generating the output information in response to software control.

12. Apparatus according to claim 1 further comprising means, connected to said data processing means, for displaying the present information and the updated information.

13. Apparatus according to claim 12 wherein said means for displaying further comprises means for displaying a signal representing an insufficient acquisition of the present data.

14. An instrument, comprising:
   (a) a housing;
   (b) first peripheral means for producing first data words having present information;
   (c) programmable data processing means, having centralized control and software, for storing second data words having updated information and for comparing the first data words and the second data words and for generating third data control words having the updated information in response to the comparison, said programmable data processing means being physically remote from said housing; and
   (d) second peripheral means for functioning in response to the third data control words to output the updated information, said first and said second peripheral means being housed in said housing.

15. An instrument according to claim 14 wherein said second peripheral means comprises:
   (a) means for receiving the third data control words; and
   (b) first data lines intercoupling said receiving means and said programmable data processing means to carry the third data control words.

16. An instrument according to claim 15 wherein said first peripheral means comprises:
   (a) means for temporarily storing the first data words; and
   (b) second data lines intercoupling said storing means and said programmable data processing means to carry the first data words.

17. An instrument according to claim 16 wherein said programmable data processing means comprises bus oriented computing type network means having a control bus, an address bus and a data bus and being programmable to produce the third data control words over said data bus in response to address signals on said address bus and to control signals on said control bus, and being programmable to transfer the third data control words onto the first data lines.

18. An instrument according to claim 17 wherein said bus oriented computing type network means comprises a centralized clock to produce clock pulses over said control bus, and wherein said second peripheral means comprises a control line intercoupling said means for receiving and said bus oriented computing type network means to carry the clock pulses.

19. An instrument according to claim 18 wherein said first peripheral means comprises a control line intercoupling said means for temporarily storing and said bus oriented computing type network means to carry the clock pulses.

20. An instrument according to claim 14 wherein said first peripheral means comprises:
   (a) means for reading first data from a tangible medium;
   (b) means for converting the first data to the first data words and for storing the first data words;
   (c) a control line intercoupling said converting and storing means and said programmable data processing means;
   (d) a data line intercoupling said converting and storing means and said programmable data processing means; and
   (e) said programmable data processing means having means for producing centralized clock pulses over said control line to clock said converting and storing means, and said programmable data processing means receiving the first data words over said data line.

21. An instrument according to claim 20 wherein said means for reading comprises an optical reader.

22. An instrument according to claim 14 wherein said second peripheral means comprises:
   (a) means for temporarily storing the third data control words;
   (b) data lines intercoupling said storing means and said programmable data processing means;
   (c) a control line intercoupling said storing means and said programmable data processing means;
   (d) said programmable data processing means having means for producing centralized clock pulses over said control line to clock said storing means, and said programmable data processing means supplying the third data control words over said data lines; and
   (e) means, connected to said storing means, for writing the updated information onto a tangible medium under control of the third data control words.

23. An instrument according to claim 22 wherein said means for writing comprises ink jet printing means for supplying ink onto the tangible medium.

24. An instrument according to claim 23 wherein said ink jet printing means comprises:
   (a) means for generating droplets of ink;
   (b) means for deflecting the droplets of ink; and
   (c) said storing means having means for gating portions of the third data control words to control said generating means and to control said deflecting means.

25. Apparatus for transferring information onto a tangible medium having present data including present information, comprising:
   (a) a hand-held type instrument including optical means for reading the present data from the tangible medium and for generating first data words representing the present data;
   (b) programmable bus oriented computing type network means including means for storing second data words having updated data including updated information corresponding to the present data and present information, said network means processing the first data words with the second data words and producing third data control words having the updated information; and
   (c) ink jet printing means for writing the updated information onto the tangible medium under control of the third data control words, said ink jet printing means being included in said hand-held type instrument and said network means being spaced-apart from said hand-held type instrument.

26. Apparatus according to claim 25 wherein said programmable bus oriented computing type network means is programmable to compare the first data words with the second data words and to generate the third data control words in response to the comparison.

27. Apparatus according to claim 26 wherein said ink jet printing means comprises:
   (a) controllable means for supplying droplets of ink to the tangible medium;
   (b) controllable means for deflecting the droplets of ink; and
   (c) electronic control circuit means for controlling said controllable supplying means and said controllable deflecting means in response to the third data control words to supply and to deflect the droplets of ink.

28. Apparatus according to claim 27 wherein the third data control words have first bits to control said controllable supplying means and have second bits to control said controllable deflecting means.

29. Apparatus according to claim 28 wherein said electronic control circuit means comprises:
   (a) means for storing the third data control words;
   (b) first means for gating the first bits to said controllable supplying means;
   (c) second means for gating the second bits; and
   (d) means, connected to said second gating means, for generating a deflection control signal in response to the second bits.

30. Apparatus according to claim 29 wherein the third data control words have the second bits for X and Y deflection, wherein said means for storing comprises a first register for storing the X-deflection second bits and a second register for storing the Y-deflection second bits, and wherein said deflection control signal generating means comprises a first sample and hold circuit for producing an X-deflection voltage signal having an amplitude proportional to the information of the X-deflection second bits and a second sample and hold circuit for producing a Y-deflection voltage signal having an amplitude proportional to the information of the Y-deflection second bits.

31. Apparatus according to claim 30 wherein the first bits have information to produce the ink droplets, and wherein said controllable supplying means comprises a pulse generator being responsive to the first bits and an ink reservoir vibrator connected to said pulse generator.

32. Apparatus according to claim 25 wherein said programmable bus oriented computing type network means is programmable to receive the first data words, to search for the second data words corresponding to the received first data words, to produce a first flag signal if the searched second data words are not found and to produce a second flag signal if the first data words are insufficient to search for the second data words.

33. Apparatus according to claim 32 further comprising means for displaying the present information in response to the first data words, for displaying the updated information in response to the second data words, for displaying the first flag signal and for displaying the second flag signal.

34. Apparatus according to claim 25 wherein said optical means for reading comprises:

(a) an optical scanner having a light sensitive photocell for producing analog signals representing the present data;
(b) an analog-to-digital converter for converting the analog signals to the first data words; and
(c) storage register means for storing the first data words.

35. Apparatus according to claim 34 further comprising means for adjusting the light sensitivity of said photocell.

36. Apparatus for producing updated information on a blank tangible medium, comprising:
   (a) data processing means for storing and for outputting output information being the same as the updated information;
   (b) data transfer means, responsive to the output information, for transferring the updated information onto the tangible medium; and
   (c) means for acquiring the transferred updated information from the tangible medium, said data processing means including means for processing the stored output information with the acquired updated information to determine if the updated information has been properly transferred onto the tangible medium.

37. Apparatus according to claim 36 wherein said means for processing comprises a programmable bus oriented computing type network.

38. Apparatus according to claim 36 wherein said data transfer means comprises an ink jet printer.

39. Apparatus according to claim 36 wherein said means for acquiring comprises an optical character reader.

40. Apparatus for producing updated information on a tangible medium having present data including present information, comprising:
   (a) means for acquiring the present data having the present information from the tangible medium;
   (b) data processing means for storing updated data having the updated information and for processing the present data and the updated data to produce output information being the same as the updated information, said data processing means including
      (i) means for producing the updated data, and
      (ii) programmable bus oriented computing type network means for receiving the updated data from said producing means, said producing means being external to said programmable bus oriented computing type network means; and
   (c) data transfer means, responsive to the output information, for transferring the updated information to the tangible medium.

41. Apparatus according to claim 40 wherein said programmable bus oriented computing type network means comprises a micro-computing unit being programmable to compare the updated information with the present information.

42. Apparatus according to claim 41 wherein said means for producing the updated data comprises storage means for storing the updated data and being connectable to said programmable bus oriented computing type network means.

43. Apparatus according to claim 42 wherein said storage means comprises a cassette recorder.

44. Apparatus for producing updated information on a tangible medium having present data including present information, comprising:

(a) means for acquiring the present data having the present information from the tangible medium;
(b) data processing means for storing updated data having the updated information and for processing the present data and the updated data to produce output information being the same as the updated information; and
(c) data transfer means, responsive to the output information, for transferring the updated information to the tangible medium, said data transfer means including
  (i) ink jet printing means for producing ink droplets to print the updated information onto the tangible medium, and
  (ii) means, responsive to the output information, for controlling said ink jet printing means.

45. Apparatus according to claim 44 wherein said ink jet printing means comprises a handheld ink jet printer.

46. Apparatus according to claim 44 wherein the output information includes data control words and wherein said means for controlling comprises electronic control circuit means for processing the data control words to deflect the ink droplets.

47. Apparatus according to claim 46 wherein said electronic control circuit means for processing further processes the data control words to activate said ink jet printing means to produce the ink droplets.

48. Apparatus for producing updated information on a tangible medium having present data including present information, comprising:
(a) means for acquiring the present data having the present information from the tangible medium;
(b) data processing means for storing updated data having the updated information and for processing the present data and the updated data to produce output information being the same as the updated information, said data processing means including programmable bus oriented computing type network means for generating the output information in response to software control; and
(c) data transfer means, responsive to the output information, for transferring the updated information to the tangible medium, said data transfer means including
  (i) ink jet printing means for printing the updated information onto the tangible medium; and
  (ii) electronic control circuit means, responsive to the output information, for controlling said ink jet printing means.

49. Apparatus for producing updated information on a tangible medium having present data including present information, comprising:
(a) means for acquiring the present data having the present information from the tangible medium;
(b) data processing means for storing updated data having the updated information and for processing the present data and the updated data to produce output information being the same as the updated information;
(c) data transfer means, responsive to the output information, for transferring the updated information to the tangible medium; and
(d) means, connected to said data processing means, for displaying the present information and the updated information and for displaying a signal representing an insufficient acquisition of the present data and for displaying a signal representing that updated data corresponding to the present data is not in storage in said data processing means.

* * * * *